Oct. 24, 1967   L. VARIS   3,348,566

SELF-CLEANING VALVE STRUCTURE

Filed Aug. 18, 1964   2 Sheets-Sheet 1

INVENTOR
LEE VARIS
BY
Jonathan Plaut

ATTORNEY

Oct. 24, 1967 L. VARIS 3,348,566
SELF-CLEANING VALVE STRUCTURE
Filed Aug. 18, 1964 2 Sheets-Sheet 2

INVENTOR
LEE VARIS
BY
Jonathan Plaut
ATTORNEY

United States Patent Office 3,348,566
Patented Oct. 24, 1967

3,348,566
SELF-CLEANING VALVE STRUCTURE
Lee Varis, Summit, N.J., assignor to Air Reduction Company, Incorporated, New York, N.Y., a corporation of New York
Filed Aug. 18, 1964, Ser. No. 390,430
1 Claim. (Cl. 137—242)

This invention relates to a valve mechanism including resilient means attached to the valve structure which deforms upon closing to dislodge impurities imbedded thereon.

More particularly, this invention relates to a single state or multi-stage regulator utilizing valve structure with resilient projection means thereon, and a hard surfaced seat contacting said resilient projection means for the regulation of gas flow through said valve structure without interference from chips or other impurities.

In the usual valve mechanism there is a point or area of contact between one surface and another, the separation of which regulates the amount of flow through said valve. In one well known valve structure, the valve mechanism consists of a ball seated against a hard orifice disc or seat. (The ball is commonly of polished stainless steel and the orifice disc of some hard rubber or plastic material.)

Valve structure of the type just described have a very low tolerance for foreign material, particularly metal chips, which chips not only clog up the separation between the two surfaces, but become lodged in one surface disrupting the fit of one surface against the other and after permanently scarring one surface, or both, thus interfering with proper functioning of the valve structure. Although a filter is usually placed in the inlet area of the valve mechanism, such filter may not be one-hundred percent effective. Over a period of time dirt and other impurities may pass through the filter. Furthermore, upon assembly of the valve structure, the screwing in of the inlet mechanism, or high pressure gage, or other structure in the valve mechanism often creates chips upstream of the filter.

As briefly explained above, besides chips or other impurities interfering with the proper functioning of the valve structure within a regulator by blocking the opening therebetween or not permitting full closure of said structure, the pressure of the valve surfaces against one another (the ball against the seat, for example) when closed will often imbed the chip into one surface and create a groove in said surface, which groove then interferes with the proper functioning of the valve mechanism.

It is theoretically desirable at the point of seal, that is at the point at which the valve structure surfaces meet, to have line contact between said surfaces of the valve structure. Line contact allows for the distribution of the force of the vertical load against one part of the valve structure to be distributed over a small area of the corresponding part of the valve structure against which the first mentioned part bears when the valve is closed. However, a small chip or other impurity at the point of contact of the two surfaces may not only ruin the line contact seal but also may cause impression to be made in one of the surfaces when the surfaces come in close proximity or in actual contact under pressure, which impression mars proper sealing and valve functioning in the future, even if the chip eventually becomes dislodged.

It has been proposed to use a resilient material for at least one surface of the valve structure, so that the chip will not cause permanent damage but merely become imbedded in such resilient material. However, when the valve mechanism is placed under a load and then subject to the gasload pressure, such distorting pressure tends to distort the resilient material and rip it, sometimes even dislodging it.

It is an object of this invention to propose particular valve structure seat design which allows for a lasting good seal between corresponding valve surfaces.

It is further an object of this invention to propose valve structure which allows for a good seal between corresponding surfaces of the valve structure and for temporary deformation of one of the surfaces, so as to not allow a chip or other impurity to cause permanent damage, ripping or permanent dislocation from its natural position under gas load pressure.

It is still another object of this invention to propose a particular valve structure design which provides for rejection of chips or impurities therefrom.

It is further an object of this invention to provide a simple, rugged, effective valve structure design.

Other objects and advantages of this invention will become apparent upon examination of the following more detailed disclosure and in association with the accompanying drawings.

Figure 1:
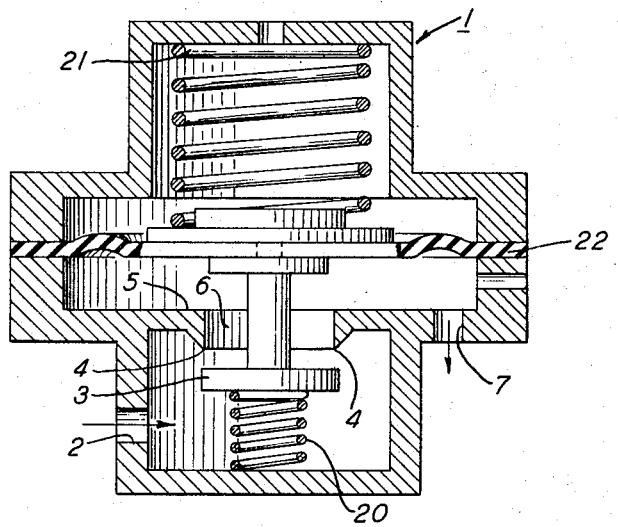
FIGURE 1 illustrates an example of a regulator incorporating well known valve structure of the prior art.

The regulator 1 of FIGURE 1 is known in and is illustrative of the prior art. It is the inverse or indirect type; that is, the higher the inlet pressure through inlet 2, the greater the tendency to close the valve 3 against the points of contact 4 of the nozzle seat structure 5 of the valve structure 6. (Conversely, a decrease in inlet pressure tends to open the valve area between valve 3 and points of contact 4.)

The regulator 1 of FIGURE 1 contains the usual spring 20 and 21 diaphragm 22 structure which is usually found in such a mechanism. The gas exits through the outlet 7. The closing of the valve structure of the regulator is effected by pressing the valve 3 against the points 4 of the nozzle seat 5.

A difficulty encountered with the regulator of FIGURE 1 is that when chips or other impurities become lodged on the points 4 or the valve 3 at the point of contact with the points 4, they interfere with the proper functioning of the valve by blocking the opening and preventing closing of the valve, and further, they permanently disrupt functioning of the valve by becoming imbedded in either the points 4 or the valve 3 and grooving it, thus marring the valve structure for further use.

A similar problem as that discussed with relation to FIGURE 1 will occur in other valve structure designs, such as the commonly used ball and disc seat structure, not designed according to this invention. The valve structure of FIGURE 1 has been used merely to illustrate the problem, and is merely representative of the valve structures of the prior art.

Figure 2:
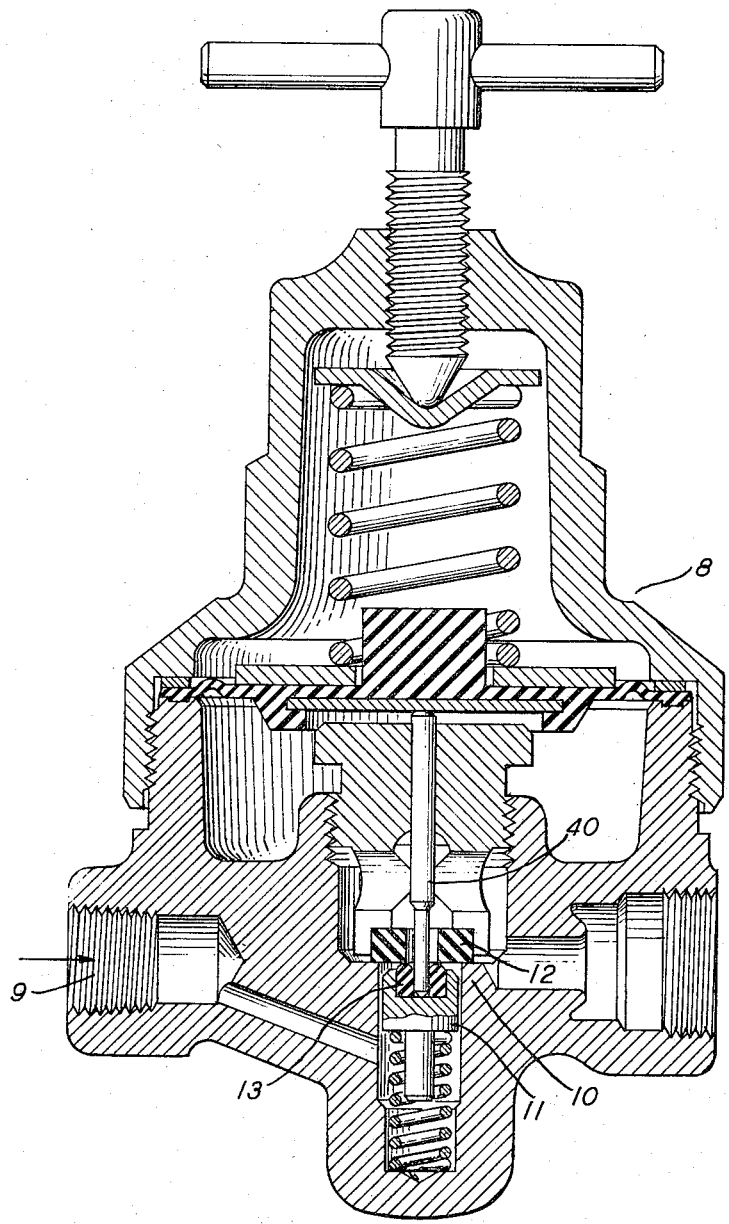
FIGURE 2 illustrates a regulator incorporating the valve structure of this invention.

To alleviate the problem caused by chips or other impurities, as discussed in relation to FIGURE 1, and still allow for a rugged construction which will not be damaged by the load of the gas pressure within the regulator, the inventor has designed a valve structure illustrated by the regulator design 8 of FIGURE 2. As in the regulator of FIGURE 1, gas under high pressure is admitted through the inlet 9. The valve structure itself shown generally at 10 is composed of a valve seat holder 11 and a hard seat 12, which may be composed of hard rubber or plastic or other desired material. Located on the valve seat holder 11 surrounding the supporting pin 40 is a resilient projection 13 which comes in contact upon closure of the valve structure 10 with the hard seat 12. The projection may be made of a soft elastomer (for example, rubber) or other resilient material. It is rounded, for example toroidal, in shape.

The regulator 8 of FIGURE 2 contains the other well known structure common to regulator designs, such as the biasing spring, the diaphram assembly, etc. These other parts of the regulator are not the subject matter of this invention. Rather, what is the subject of this invention is the valve structure just described and such valve structure may be used with the regulator design desired.

Figure 3:
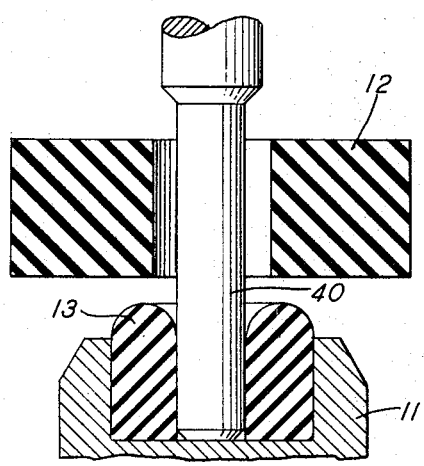
FIGURES 3 through 5 show a detailed view of the valve structure in three positions of operation.
Figure 4:
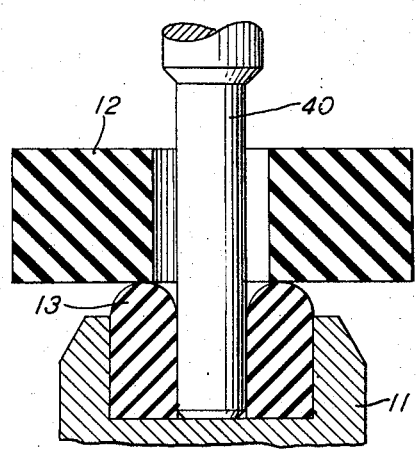
Figure 5:
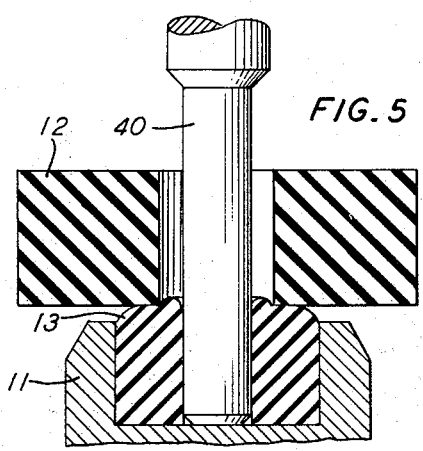

Generally, the valve structure just described functions in such a manner that when the valve seat holder is under a vertical gas load the toroidal shaped soft rubber projections 13 come in contact with the hard rubber seat, as shown in FIGURE 4. (FIGURE 3 shows the valve structure before contact of the rounded projection 13 and seat 12.) The gas coming through the inlet 9 and passing through the striction made by the resilient projection 13 and hard seat 12 distorts the projection 13, as shown in FIGURE 5. Because of the toroidal shape of the tip of the projection 13, the pressures of the tip of the projection created by the gas load impinging thereagainst are modified so as not to be sufficient to rip the projection 13 from the valve holder 11. The distortion of the projection against the seat 12 causes a movement of the rounded tip of the projection and a concurrent resultant dislodgment of any chips or impurities on the projection.

Because the rounded projection is resilient, it is able to deform resiliently around the chip or impurities thereon and still close and seal the valve opening when so required, and then subsequently, if not before, as above, eject the chip upon opening without damage to the valve holder 11 or hard seat 12. This dislodgement results in the removal of said chips or impurities from the projection so that they do not inhibit subsequent closure of the valve structure and so that they do not permanently damage the valve structure by grooving it.

The resilient projection 13 may be bonded to the valve holder 11, or may be attached thereto by any other manner desired.

The position of the resilient projection 13 on the valve seat holder 11 and surrounding the supporting pin 40, as shown in FIGURE 2 serves to truly guide the valve holder 11 from its position in FIGURE 3 to its position in FIGURES 4 and 5.

It is not intended that the invention be limited by the details of the valve structure discussed above, rather it is intended that the invention be limited only by the scope of the claim which follows hereafter.

I claim:

Valve structure for controlling the flow of a fluid through a passageway between a higher pressure area and a lower pressure area comprising a valve seat holder, a resilient toroidal-shaped projection protruding from said holder, said projection being rounded on its protruding end, a hard valve seat surrounding a circular entrance to said passageway from said higher pressure area, said projection having a mean diameter only slightly larger than said circular entrance, said projection and said circular entrance having substantially the same axis, said projection being partially extruded into said passageway when the valve is closed, whereby the extrusion of said projection upon the closing of the valve dislodges impurities which are present on the resilient projection and the valve seat prior to the closing of the valve.

References Cited

UNITED STATES PATENTS

| 1,947,257 | 2/1934 | Fritz | 251—357 X |
| 2,397,269 | 3/1946 | Kelly | 251—357 X |
| 2,470,744 | 5/1949 | Korn | 251—5 X |
| 2,617,625 | 11/1952 | Twyman | 137—237 X |
| 2,784,732 | 3/1957 | Nurkiewicz | 251—357 X |
| 2,787,126 | 4/1957 | Kleczek | 137—242 |
| 2,904,060 | 9/1959 | Fausek | 251—357 X |
| 2,904,068 | 9/1959 | St. Clair | 251—357 X |
| 2,972,356 | 2/1961 | Reynolds | 137—237 X |

CLARENCE R. GORDON, *Primary Examiner.*